United States Patent [19]
Shulters

[11] 3,884,592
[45] May 20, 1975

[54] PORTABLE CENTER DRILL
[76] Inventor: Robert B. Shulters, P.O. Box 71, Batavia, Ill. 60510
[22] Filed: Jan. 15, 1973
[21] Appl. No.: 323,648

[52] U.S. Cl. .................. 408/14; 408/106; 408/111; 408/129; 408/132
[51] Int. Cl. ...................... B23b 41/00; B23b 47/18
[58] Field of Search ........... 408/106, 105, 104, 103, 408/129, 107, 108, 99, 100, 111, 14, 132

[56] References Cited
UNITED STATES PATENTS
| | | | |
|---|---|---|---|
| 730,123 | 6/1903 | Hudson | 408/106 |
| 1,402,720 | 1/1922 | Bartlett | 408/106 |
| 2,909,081 | 10/1959 | Kuts | 408/103 X |

Primary Examiner—Gil Weidenfeld
Attorney, Agent, or Firm—Hibben, Noyes & Bicknell

[57] ABSTRACT

A portable center drill wherein a tubular support number has a centering chuck mounted on one end thereof. The centering chuck serves to clamp the drill onto one end of a workpiece to be center drilled and to precisely align the axis of a drill bit with the center of the end of the workpiece. The drill bit is releasably mounted in a drill chuck that is rotatably mounted in an axially movable carriage in the support number. The drill bit chuck is driven by an electric motor through a reduction gear train. A manually actuated feed mechanism effects axial movement of the carriage in the support member and an adjustable stop in the feed mechanism permits adjustment of the depth of the hole made by the drill bit. A torque limiting clutch in the feed mechanism prevents an operator from applying excessive pressure on the drill bit, and an adjusting arrangement is provided for initially adjusting the positions of the jaws of the centering chuck so that the drill bit will be automatically aligned with the centers of workpieces of different diameters when the centering chuck is engaged with such workpieces.

9 Claims, 9 Drawing Figures

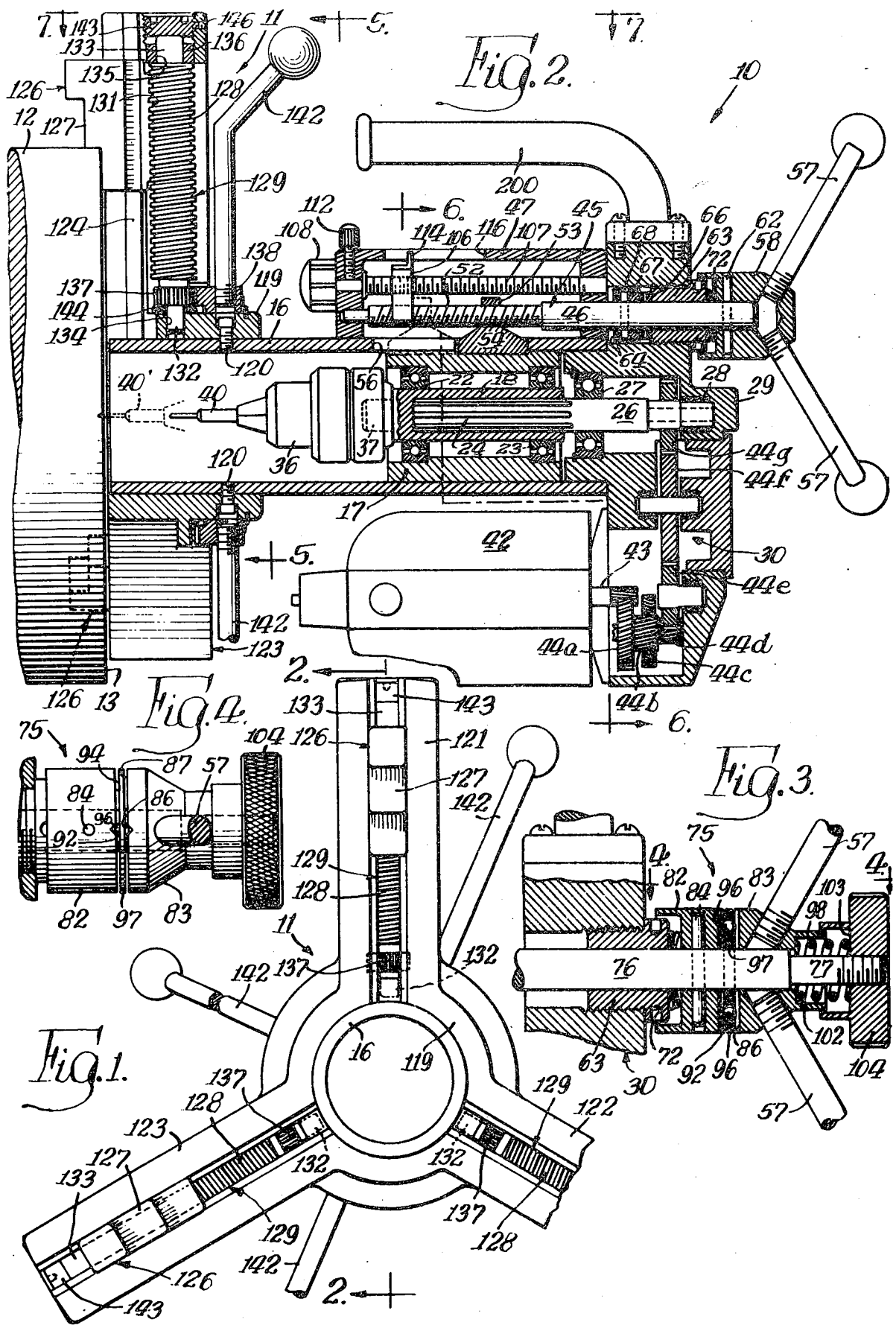

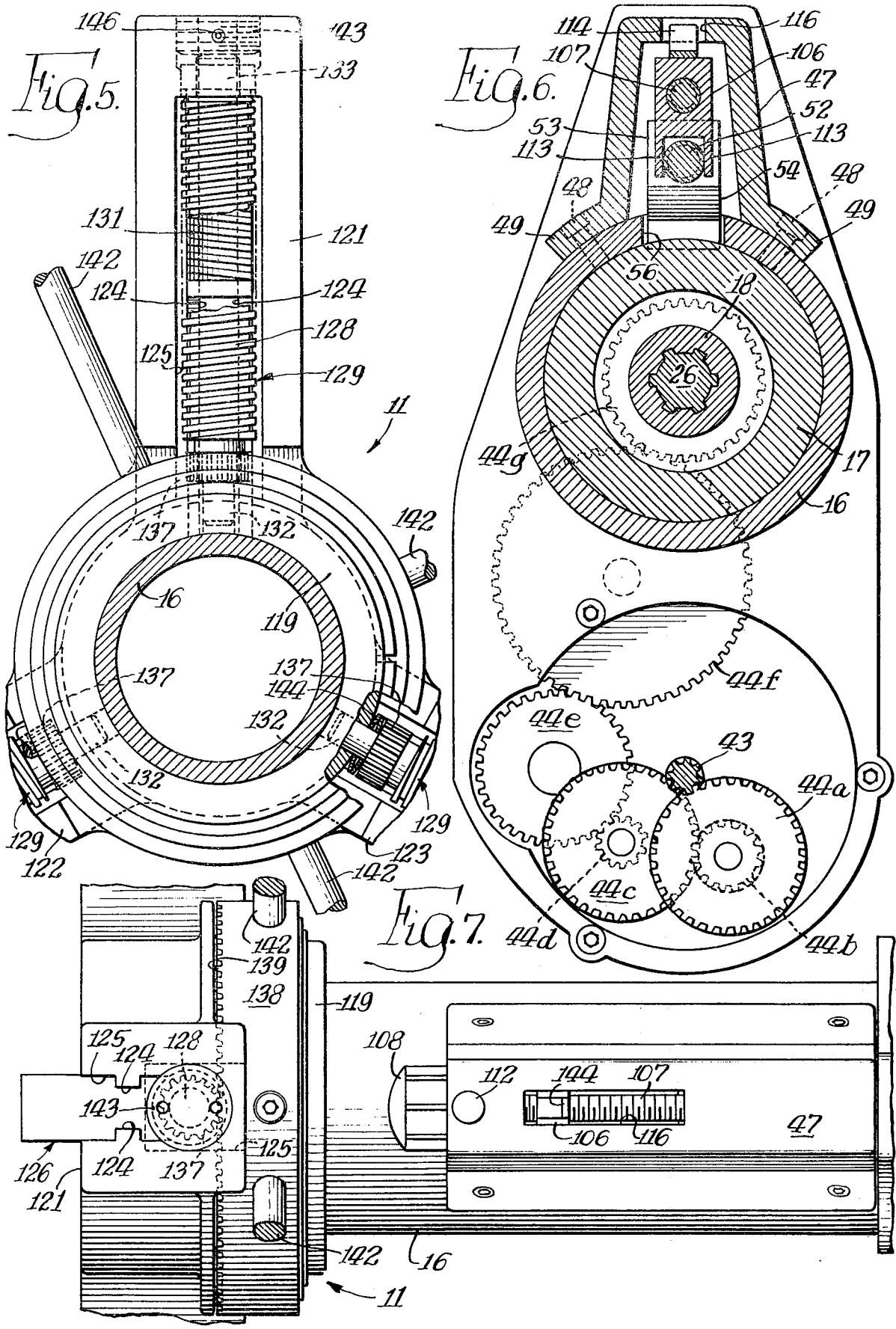

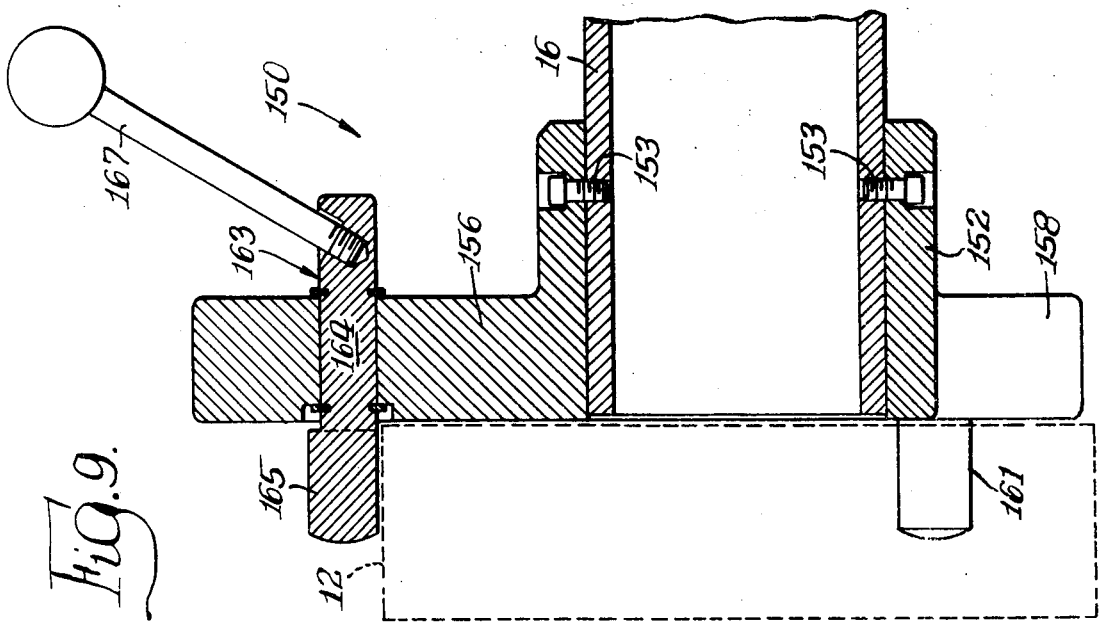
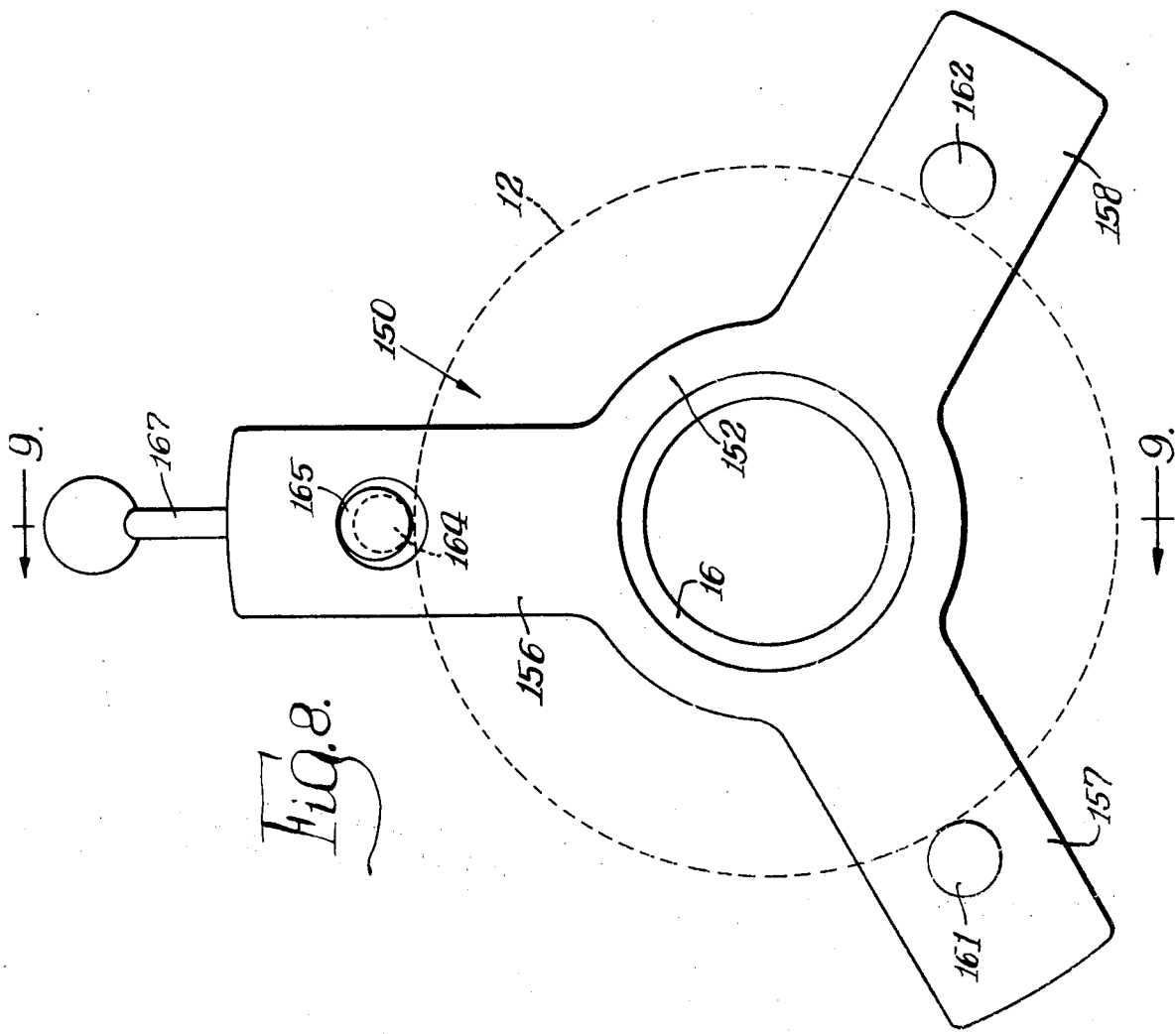

PORTABLE CENTER DRILL

This invention relates to portable drills, and more particularly relates to a portable drill for rapidly locating and accurately drilling holes in the centers of the ends of barstock material to facilitate subsequent machining operations.

One of the preliminary operations that is usually performed on bar stock materials, prior to subsequent machining, is that of drilling "center holes" in the ends of such materials. Such "center holes" have heretofore been drilled either by hand with a portable drill, or by a center drill mounted in the tailstock of a lathe, or by a special machine designed for this purpose. While it is possible to accurately center drill bar stock material by any of the foregoing methods, each is subject to certain disadvantages.

Thus, the first mentioned method, i.e., hand drilling of the center hole, is disadvantageous from an accuracy standpoint in that it is very difficult to locate the exact center of the end of a bar by a hand layout and then to accurately drill a hole in the center of the end of the bar that is not out of round or somewhat misaligned.

The second mentioned method, i.e., center drilling with a lathe, while accurate, is time consuming and a poor use of the skill of the machinist operating the lathe and the capabilities of this machine tool.

The third mentioned method, i.e., the use of a special machine, frequently referred to as a "centering machine," is disadvantageous because such machines are expensive and require trained operators to properly use them. In addition, their size and weight makes it necessary to permanently mount such machines in fixed locations so that the pieces to be center drilled must be transported to and from the machine. Moreover, many "centering machines" cannot accommodate stock that is more than 5 or 6 feet in length.

Accordingly, it is a general object of the present invention to provide a novel portable drill for precisely locating and drilling holes in workpieces, such as bar stock materials, which overcomes the aforementioned disadvantages.

Another object is to provide a novel portable drill of the foregoing character, which is capable of rapidly and accurately drilling holes in the centers of the ends of one or more lengths of bar stock and which requires little or no movement of the workpiece prior to or during a drilling operation.

A further object is to provide a novel portable drill having a centering chuck which serves to releasably clamp the drill onto the end of a workpiece and to precisely align the drilling bit thereof with the center of the end of the workpiece.

Still another object is to provide a novel portable drill of the foregoing character, wherein the centering chuck thereof may be initially adjusted for subsequent centering operations in a simple and rapid manner.

A further object is to provide a novel portable drill having a torque limiting clutch which prevents an operator from applying excessive feed pressure on the drill bit of the device during a center drilling operation.

Still another object is to provide a novel portable drill which is accurate in operation, simple in construction, and economical to manufacture and maintain.

Other objects and advantages will become apparent from the following detailed description and accompanying sheets of drawings, in which:

FIG. 1 is an end elevational view, with portions thereof broken away, of a portable center drill embodying the features of the invention;

FIG. 2 is a longitudinal sectional view taken along the line 2—2 of FIG. 1;

FIG. 3 is a fragmentary longitudinal sectional view through a torque limiting clutch which may be employed in the feed mechanism of the center drill illustrated in FIG. 2;

FIG. 4 is a top plan view taken substantially along the line 4—4 of FIG. 3;

FIG. 5 is an enlarged vertical sectional view, with portions thereof broken away, of the centering chuck utilized in the portable center drill illustrated in FIG. 2 and taken substantially along the line 5—5 of FIG. 2;

FIG. 6 is a sectional view taken substantially along the line 6—6 of FIG. 2;

FIG. 7 is a top plan view taken substantially along the line 7—7 of FIG. 2;

FIG. 8 is an end elevational view of another centering chuck which may be employed in the portable center drill illustrated in FIG. 2; and FIG. 9 is a vertical sectional view taken substantially along the line 9—9 of FIG. 8.

In FIGS. 1 and 2, a portable center drill embodying the features of the present invention, is illustrated and indicated generally at 10. The center drill 10 includes chuck means in the form of a centering chuck 11 to be hereinafter described in detail, for engaging the end portion, indicated at 12, of a workpiece to be center-drilled and releasably clamping the drill 10 to the workpiece. In the present instance, the workpiece 12 comprises a length of bar stock material, circular in cross section, and having an end face 13 to be center drilled.

As best seen in FIG. 2, the center drill 10 comprises a tubular support member 16 within which a carriage 17 is shiftably mounted. The carriage 17 is also preferably tubular, and a tubular shaft 18 is rotatably mounted in a pair of axially spaced bearings 22 and 23 secured in the carriage 17. The interior of the shaft 18 is splined to mate with complimentally formed splines 24 on the exterior of another shaft 26 extending into the shaft 18. The shaft 26 is rotatably journaled in a pair of axially spaced bearings 27 and 28 in a housing 29 at one end of the support member 16. A reduction gear train, indicated generally at 30, is also mounted in the housing 29, and will be described more fully hereinafter.

Retaining means in the form of a drill bit chuck 36 is secured to a reduced diameter portion 37 of the shaft 18 for axial movement with the shaft and carriage 17. A typical center drill bit 40 is shown mounted in the chuck 36 in co-axial relation with the shaft 18 and tubular guide member 16. Rotation of the chuck 36, and consequently the drill bit 40, is achieved through drive means in the form of an electric motor 42.

The motor 42, in the present instance, is secured to the reduction gear housing 29 by fasteners (not shown) and receives power through electrical conductors (also not shown). The output shaft, indicated at 43, of the motor 42 is meshed with the gears indicated at 44a–44g, inclusive, in FIGS. 2 and 6, of the reduction gear train 30, and ultimately with the drive shaft 26. Thus the shaft 26 is driven at a reduced rate of speed, in a well-known manner. Consequently, when the motor 42 is energized, the drill bit 40 rotates at an appropriate rate of speed for a center drilling operation.

In order to advance the drill 40 into the workpiece during a center drilling operation, the drill 10 includes feed means. Such feed means includes a screw 45 having a cylindrical shaft portion 46 which is rotatably journaled in a housing 47 (FIGS. 2 and 6) secured to the upper portion of the support member 16. The housing 47 may be secured to the support member 16 by screws 48 extending through curved flanges 49 (FIG. 6) at the base of the housing 47. The screw 45 has a threaded portion 52 which is threaded into a tab or upwardly extending portion 53 of a bracket 54. The threads on the threaded portion 52 and in the tab portion 53 of the bracket 54 are preferably left-handed.

The lower portion of the bracket 54 extends through an axial slot 56 in the upper surface of the support member 16 and the lower portion of the bracket 54 is secured to a carriage 17 by bolts (not shown). Thus axial movement of the bracket 54 due to rotation of the screw 45, effects a corresponding movement of the carriage 17 and drill bit 40. Rotation of the screw 45 is achieved, in the present instance, by manually turning one or the other or both of a pair of handles 57. The handles 57, in the present instance, are threaded into a hub 58 which is secured to the shaft portion 46 of the screw 45 as by a pin 62.

In order to resist the thrust applied to the screw 45 from the drill bit 40, a tubular thrust nut 63 is threaded into an opening 64 in the reduction gear housing 29, and a thrust bearing 66 is mounted on the shaft portion 46 between the thrust nut 63 and a collar 67 carried on the shaft portion 46 and fixed thereto by a pin 68. Thus, thrust exerted on the screw 45 in an axially outward direction, or toward the right as viewed in FIG. 2, during a center drilling operation is transmitted by the collar 67 to the thrust bearing 66 and thence to the thrust nut 63. When the drill 10 is inoperative, or the bit 40 is not drilling, end play between the screw 45 and its mounting is taken up by a spring washer 72 mounted on the shaft portion 46 between the outer face of the nut 63 and the hub 58.

With the foregoing construction is will be apparent that after the centering chuck 11 has been clamped onto the end portion 12 of the workpiece and the motor 42 of the drill 10 has been energized, turning of the handles 57 of the feed mechanism will advance the center drill bit 40 into the end face 13 of the workpiece and accurately center drill the same. The position of the drill bit 40 after the pilot portion thereof has entered the workpiece, is illustrated in broken lines indicated at 40' in FIG. 2.

It will further be apparent that, since the tubular support member 16, electric motor 42, and feed mechanism are arranged in closely adjacent, side-by-side relation, the overall length of the drill 10 is reduced and the drill is thereby rendered more compact. In addition, as a result of the side-by-side relationship of the aforementioned components, the center of gravity of the drill is closer to the workpiece 12 than it would be if these parts were arranged in end-to-end or tandem relation. Consequently, a smaller bending moment is imposed on the centering chuck 11 than would be imposed if the aforementioned parts were arranged in tandem. This is advantageous.

During a center drilling operation, the operator of the tool must not exert excessive pressure on the point of the center drill bit 40 by too rapid turning of the handles 57. Otherwise, the chuck 11 might become disengaged from the workpiece so that the drill 10 could fall upon and possibly injure the operator. In addition, the bit 40 might break and thus render the workpiece unuseable. To eliminate, or at least substantially reduce either of these possibilities, a torque limiting device or clutch, illustrated in FIGS. 3 and 4 and indicated generally at 75, may be utilized in the center drill 10.

The clutch 75 is mounted on a shaft 76 having the same general configuration as the shaft portion 46 of the screw 45, but differs therefrom in that the shaft 76 is somewhat longer than the shaft portion 46 and includes a reduced diameter threaded portion 77. A two-part hub, comprising a first hub member or part 82 and a second hub member or part 83, is mounted on the shaft 76, the part 82 being fixed to the shaft 76 by a cross pin 84 and the part 83 being freely rotatably mounted on the shaft 76.

As best seen in FIG. 4, a diametrically extending V-shaped groove 86 is provided in the end face, indicated at 87, of the hub part 83, and another diametrically extending V-shaped groove 92 is provided in the end face 94 of the hub part 82. At least one and preferably a pair of clutch elements in the form of a pair of appropriately sized balls 96 are mounted between the end faces 94 and 87 of the hub parts 82 and 83, respectively. The balls 96 are retained in diametrically spaced relation by a plate 97 having a pair of diametrically arranged openings therein for receiving the balls 96. The grooves 86 and 92 and the balls 96, thus comprise clutch means for releasably interconnecting the hub members 82 and 83.

The hub part 83 is urged axially toward the hub part 82 by a coil spring 98, the spring 98 being mounted on a reduced diameter portion 77 of the shaft 76 and having its inner end engaged with a shoulder 102 provided on the outer end of the hub part 83. The outer end of the coil spring 98 bears against the end face, indicated at 103, of an adjusting knob 104 threaded onto the outer end of the shaft portion 77. Thus, the force exerted by the spring 98 on the hub part 83 and urging it toward the hub part 82 may be varied by rotating the knob 104 in opposite directions.

The torque limiting clutch 75 operates as follows:

Assuming that the knob 104 has initially been threaded onto the shaft portion 76 by an amount sufficient to place a desired preload on the spring 98, torque applied to the hub part 83 by the handles 57 will be transmitted through the balls 96 to the hub part 82 and thence to the shaft 76 so long as the balls 96 remain in the grooves 86 and 92. However, if the torque applied by the operator to the handles 57 exceeds the force exerted by the spring 98 holding the balls 96 in the grooves 86 and 92, the hub part 83 will move away from the hub part 82 and the balls 96 will ride up on the end faces 87 and 94. Consequently, the hub part 83 will freewheel on the shaft 76 and the latter will therefore cease to rotate. Cessation of rotation of the shaft 76 prevents the carriage 17 and drill bit 40 from advancing, except for the slight distance the carriage and drill bit advance while the hub part 83 is freewheeling. In other words, when the hub part 83 begins to freewheel, the drill bit will continue to advance into the workpiece until the point pressure is relieved.

As soon as the operator feels the hub part 83 begin to freewheel, he will know that he has applied a greater torque to the feed mechanism of drill bit 40 than is required for an optimum feed rate. Consequently, he will reduce the amount of torque applied to the handles 57 so that the pressure on the drill point is maintained within safe limits.

After the hub part 83 begins to freewheel on the shaft 76, the balls 96 will roll on the end faces 87 and 94 of the hub parts 83 and 82 until the balls drop into the grooves 86 and 92. Since there is only one diametric groove in each of the end faces 87 and 94, it will be apparent that the hub part 83 will have to rotate 360° relative to the hub part 82 before the balls 96 again drop into the grooves 86 and 92. After the balls 96 have dropped into the grooves 86 and 92, the hub part 83 again becomes effective to transmit torque to the hub part 82 and hence to the shaft 76. Consequently, the drilling operation can then be resumed. However, the operator will have to reduce the amount of torque applied to the handles 57 in order to prevent the clutch 75 from again repeating its cycle. In this regard, the clutch 75 will immediately disengage if the point of the drill bit 40 has become too dull to cut properly, or is broken. The operator will thus be made aware of the need for corrective measures.

In order to control the depth of the hole made by the bit 40 during the center drilling operation, stop means is provided for limiting the travel of the carriage 17. Such stop means comprises a generally rectangularly shaped block 106 threaded onto a screw 107 that is rotatably mounted at its ends in the housing 47. One end of the screw 107 extends through the end wall of the housing 47, and is provided with a knob 108 for effecting rotation of the screw 107 in opposite directions. A locking screw 112 may be threaded into the housing 47 for engaging the screw 107 and locking the same and the stop 106 in an adjusted position.

As best seen in FIG. 6, the lower portion of the stop 106 is bifurcated so that the leg portions thereof, indicated at 113, straddle the threaded portion 52 of the screw 45 and are in alignment with the tab portion 53 of the bracket 54. Thus, the stop 106 will limit the extent of movement of the bracket 54, and consequently the carriage 17, toward the left as viewed in FIG. 2, as the handles 57 are turned in a direction to advance the carriage 17 and drill bit 40 into the workpiece. Visual observation of the position of the stop 106 with respect to the housing 47 and guide member 16, is facilitated by an indicating finger 114 secured to upper end of the stop 106 and extending into a slot 116 in the upper surface of the housing 47.

As heretofore mentioned, the center drill 10 includes chuck means in the form of the centering chuck 11 for clamping the drill 10 onto a workpiece and for precisely aligning the axis of the drill bit 40 with a drilling point on the workpiece, such as the center of the end face of a length of bar stock. As best seen in FIGS. 1, 2, 5 and 7, the centering chuck 11 includes a hub 119, which is secured as by screws 120 (FIG. 2) to the other or opposite end of the support member 16 from the end to which the feed mechanism is secured. A plurality of radially outwardly extending arms, in the present instance, three equiangularly spaced arms 121, 122, and 123, are provided on the hub 119. Each of the arms 121-123 is provided with a pair of radially extending machined ways 124 (FIGS. 2 and 7) for receiving a chuck jaw 126. The jaws 126 are movable in the ways 124 and include stepped, outer surfaces 127 (FIGS. 1 and 2) for engaging a workpiece to be center drilled.

Movement of the jaws 126 in the ways 124 is effected by screw means carried by the arms 121-123 and engaging the jaws 126. Such screw means, in the present instance, comprises a plurality of elongated screws 129 which are positioned in radially extending recesses 125 (FIGS. 5 and 7) in the axially inner or rear sides of the arms 121-123 and which are provided with threads 128 which mesh with threaded portions 131 (FIGS. 2 and 5) on the axially inner or rear surfaces of the jaws 126. The screws 129 have journals 132 and 133 (FIGS. 2 and 5) at the radially inner and outer ends thereof, which respectively extend into bores 134 in the hub 119 and bearings 136 pressed into or otherwise secured in the radially outer ends of the arms 121-123. Thus, the screws 129 are rotatable about their longitudinal axes in the arms 121-123.

In order to effect simultaneous rotation of the screws 129 about their longitudinal axes, rotating means is provided for this purpose. Such rotating means preferably comprises a spur gear 137 fixedly carried on the lower or radially inner end of each screw 129, and a ring gear 138 (FIGS. 2 and 7) which is rotatably mounted on the hub 119 and which has teeth 139 meshed with the teeth of the spur gears 137. A plurality of handles 142 are threaded into the ring gear 138 at circumferentially spaced points therearound to permit manual rotation of the ring gear with respect to the hub 119 and consequently rotation of the screws 129.

With the foregoing construction, it will be apparent that rotation of the ring gear 138 in opposite directions will effect a corresponding rotation of the screws 129 and consequently radially inward or outward movement of the jaws 126 in the arms 121-123. Thus, the jaws 126 of the centering chuck 11 can be rapidly moved into or out of engagement with the end portion of a workpiece to be center drilled, merely by manipulating the handles 142 in an appropriate direction.

Due to manufacturing inaccuracies and inexact positioning of the jaws 126 of the centering chuck 11 during initial assembly of the chuck, the radial positions of the jaws 126 on the arms 121-123 must be initially adjusted before the chuck can be used. To this end, a jaw centering fixture (not shown) is initially mounted in the drill bit chuck 36. Thereafter, the handles 142 are turned in a direction to cause the jaws 126 of the centering chuck 11 to move inwardly and engage the centering fixture.

After one of the jaws 126 contacts the centering fixture, the handles 142 are released. The other jaws 126 are thus brought into contact with the fixture by threading adjusting plugs or screws 143 (FIGS. 1, 2, 5 and 7) into or out of the radially outer ends of the arms. The adjusting screws 143 engage the outer axial ends of the screw journals 133 and cause axial movement of the screws 129 in their respective arms. Such axial movement is accommodated by clearances between the radially inner end faces of the gears 137 and the adjacent periphery of the hub 119. Spring washers 144 (FIGS. 2 and 5) are provided on the journals 132 of the screws 129 and positioned in the aforementioned clearances between the hub 119 and gears 137, to urge the screws 129 radially outwardly in the arms so that the axially outer end faces of the journals 133 contact the adjusting plugs 143.

After one of the jaws 126 has contacted the outside diameter of the centering fixture, the other two jaws are readily brought into contact with the fixture by adjustment of the plugs 143. When all of the jaws 126 are in contact with the outside diameter of the fixture, the centering chuck 11 is then ready to accurately align the drill bit 40 with the centers of the end faces of workpieces of different diameters, merely by turning the handles 142 until each of the jaws 126 of the centering chuck 11 are in engagement with the outer surface of the work piece. The adjusting plugs 143 may be secured in position in the arms 121-123 by set screws 146 (FIGS. 2 and 5).

When the center drill 10 is to be used to center drill the ends of a large number of workpieces having a common dimension, such as number of lengths of bar stock of the same diameter, a fixed diameter chuck, indicated generally at 150 in FIGS. 8 and 9, may be used on the center drill 10 instead of the chuck 11. The chuck 150 is similar to the chuck 11 in that the former includes a hub 152 which may be secured to the work engaging end of the support member 16 as by a plurality of screws 153, only two of which are shown in FIG. 9. The chuck 150 is also similar to the chuck 11 in that it includes a plurality of radially outwardly extending arms, in the present instance, three equiangularly spaced arms 156, 157 and 158.

The chuck 150 differs from the chuck 11 in that instead of being provided with radially shiftable jaws on each of the arms 156-158, the arms 157 and 158 are provided with at least one and preferably a plurality of abutments in the form of cylindrical pins 161 and 162 respectively secured to the arms 157 and 158 so as to project axially outwardly from the side faces thereof. The pins 161 and 162 are located on the arms 157 and 158 so that the distance from the radial inner peripheries thereof to the center of the tubular support member 16 and drill bit 40 is substantially equal to the radius of the workpiece with which the chuck 150 is to be engaged. In the present instance, the chuck 150 is shown engaged with the end portion, indicated at 12, of a length of bar stock of circular cross section.

The chuck 150 also includes locking means for releasably clamping the chuck 150 to the end of a workpiece to be drilled. Such locking means preferably comprises a pin 163 having a cylindrical body portion 164 that is rotatably mounted in the arm 156, and a cylindrical head 165 that extends axially outwardly from the side face of the arm 156. The axis of the head 165 is eccentric to the axis of the body portion 164 by an amount such as to cause a portion of the head 165 to engage the outer periphery of the work piece and thus clamp the workpiece in chuck 150 when the pin 163 is rotated. A handle 167 may be secured to the body portion 164 to facilitate rotation of the pin 163. The chuck 150 may thus be employed to rapidly align the center drill bit 40 of the center drill 10 with the centers of the ends of workpieces, such as bar stock of circular or other cross section capable of being centered between the equiangularly arranged pins 161, 162 and 163, when a large number of such workpieces having a common dimension are to be center drilled.

After a center drilling operation has been completed, the chuck 150 is easily released from its engaged relation with the end of the workpiece, merely by turning the handle 167 in an appropriate direction to cause the head 165 of the pin 163 to move away from the end portion 12 of the workpiece.

A handle 200 may be provided on the drill 10 to facilitate carrying the drill to different locations and positioning the same adjacent the ends of a workpiece to be drilled.

I claim:

1. A portable center drill comprising a support member, retaining means carried by said support member for receiving and releasably retaining a drill bit or the like, drive means mounted on said support member and connected to said retaining means for rotating the same, chuck means carried by said support member and adapted to clamp onto a workpiece and to detachably secure said drill to said workpiece, said chuck means also being operable to precisely position said drill bit with respect to a drilling point on said workpiece, and feed means mounted on said support member for advancing said retaining means toward said chuck means and said drill bit into said workpiece, said support member, said drive means and said feed means being arranged in closely adjacent, side-by-side relation and said chuck means being arranged close to said drive means and said feed means, whereby the overall size and length of said drill is minimized and the bending moment imposed on said chuck means is reduced.

2. The portable center drill of claim 1, in which said support member is tubular, said retaining means is mounted in said support member and has an axis, said drive means includes an electric motor having an output shaft, and said feed means includes an elongated screw for effecting movement of said retaining means, the axes of said support member, output shaft and screw being parallel and the axes of said support member and said retaining means being substantially coincident.

3. The portable drill of claim 1, in which said support member is tubular, and said retaining means comprises a rotatably and axially shiftably mounted drill bit chuck in said support member.

4. The portable drill of claim 3, in which said drill bit chuck is mounted on a shaft, said shaft is rotatably mounted in a carriage, and said carriage is axially shiftably mounted in said support member.

5. The portable drill of claim 4, in which a bracket is secured to said carriage, said bracket includes a tab portion extending through a slot in said support member, and said feed means includes a screw that is rotatably carried by said support member and threaded into said tab portion of said bracket.

6. The portable drill of claim 5, in which said screw includes a shaft portion, and a handle is secured to one end of said shaft portion for effecting manual rotation of said screw and advancement of said drill into said workpiece.

7. The portable drill of claim 5, in which a stop is provided for engaging said tab portion of said bracket and limiting movement of said carriage toward said chuck means and hence the depth of the hole made by said drill bit.

8. The portable drill of claim 7, in which the position of said stop is adjustable so as to permit adjustment of the depth of said hole.

9. The portable drill of claim 6, in which torque limiting means is interposed between said one end of said shaft portion and said handle to prevent the torque transmitted to said shaft portion by said handle from exceeding a safe limit.

* * * * *